United States Patent [19]

Shedd et al.

[11] Patent Number: 4,887,375
[45] Date of Patent: Dec. 19, 1989

[54] ROD EXTENSION AND METHOD OF USING THE EXTENSION IN DEEP-SEA FISHING

[75] Inventors: William D. Shedd, Mission Viejo; Gregory S. Stotesbury, Corona Del Mar, both of Calif.

[73] Assignee: Aftco Mfg. Co., Inc., Irvine, Calif.

[21] Appl. No.: 314,943

[22] Filed: Feb. 24, 1989

[51] Int. Cl.$^4$ ............................................. A01K 97/10
[52] U.S. Cl. .................................................. 43/21.2
[58] Field of Search ............................ 43/21.2, 22, 23

[56] References Cited

U.S. PATENT DOCUMENTS

| | | | |
|---|---|---|---|
| 2,088,132 | 7/1937 | Domecq | 43/23 |
| 3,367,056 | 2/1968 | Johnson | 43/25 |
| 3,468,052 | 9/1969 | Hardesty et al. | 43/23 |
| 3,531,888 | 10/1970 | Wells et al. | 43/21.2 |
| 3,851,916 | 12/1974 | Quartullo | 43/21.2 |
| 3,902,269 | 9/1975 | Dunlap | 43/21.2 |
| 3,964,706 | 6/1976 | Adams | 43/21.2 |
| 4,083,141 | 4/1978 | Shedd et al. | 43/22 |
| 4,375,731 | 3/1983 | Budd | 43/21.2 |
| 4,520,587 | 6/1985 | Wallace | 43/18.1 |
| 4,654,996 | 7/1987 | Gieselman | 43/23 |
| 4,682,438 | 7/1987 | Arrow | 43/21.2 |

Primary Examiner—M. Jordan
Attorney, Agent, or Firm—Richard L. Gausewitz

[57] ABSTRACT

The butt of a deep-sea fishing rod is adapted to be manually held by a fisherman while the fisherman is standing near the rail, transom or bow of a fishing boat. Then, when the fisherman becomes tired, he telescopes the butt into a reel-raising rod-lengthening extender socket in nonrotatable relationship, following which he sits down in a fishing chair and inserts the lower end of the extender socket into the chair gimbal. The construction of the butt and the extender socket are such that even large axial forces directed downwardly toward the bucket harness as the fisherman grips the rod between the reel and the tip while fighting a fish, does not shorten the combination of the butt and extender socket. The reel is thus maintained at the proper elevated condition for fighting a fish while the fisherman is seated, and additional leverage is created whereby the fisherman is better able to fight the fish, and the overall rod length is increased sufficiently to allow the fishing line to clear the gunwale of the boat.

15 Claims, 2 Drawing Sheets

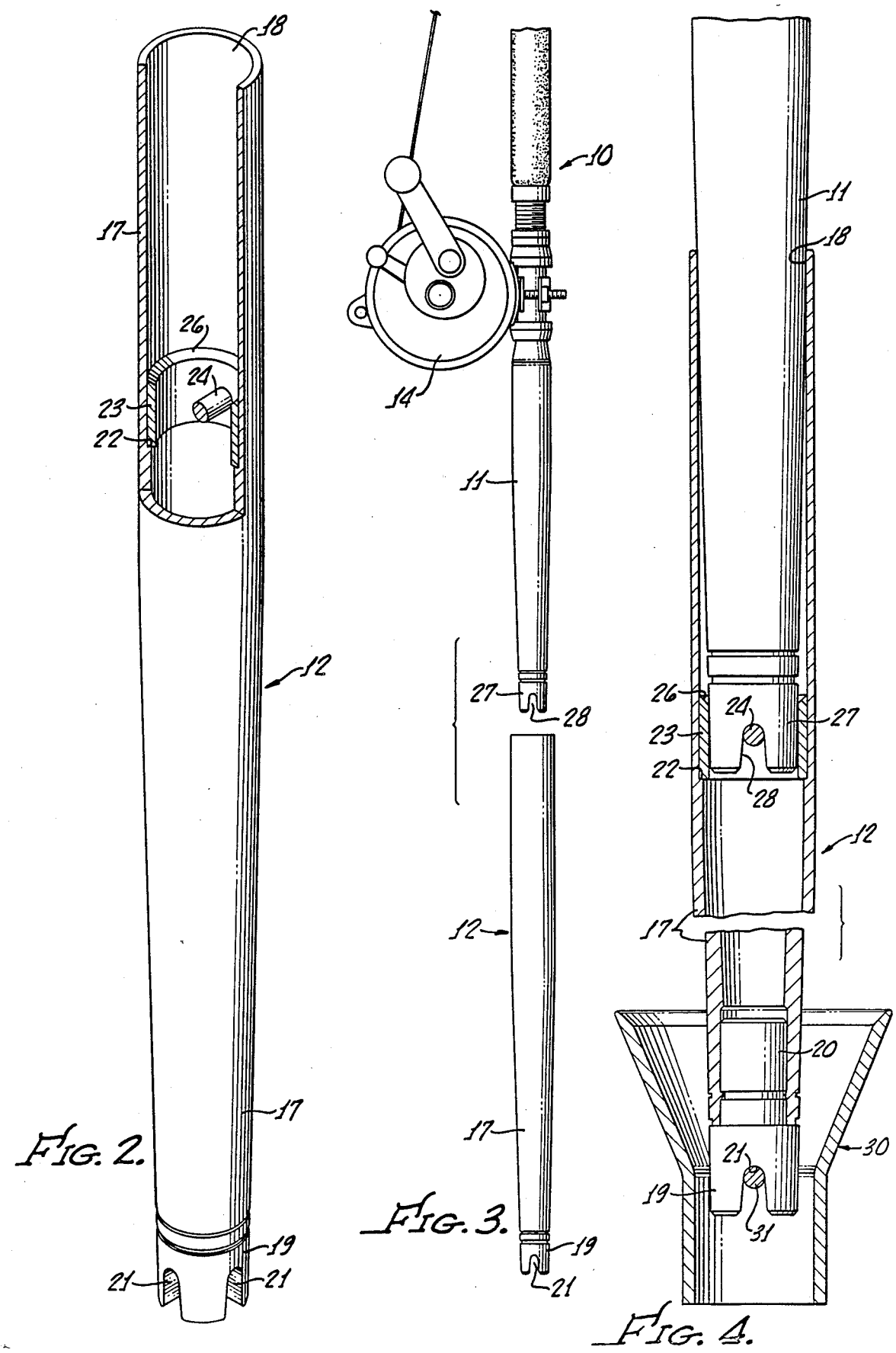

ROD EXTENSION AND METHOD OF USING THE EXTENSION IN DEEP-SEA FISHING

BACKGROUND OF THE INVENTION

Butt-extending apparatus for fishing rods has been proposed over a period of several decades, for various reasons. However, insofar as applicants are aware, nobody has previously solved the problems of: (1) permitting fishermen to move around on a boat between standing positions at the rail or transom and seated positions in a fishing chair, while effectively using a short-butt deep-sea fishing rod, (2) raising the height of the reel when the short-butt rod is disposed in a fishing chair, and keeping the reel relatively high despite substantial downward axial forces on the butt while a fish is played, (3) increasing the leverage of the fishing rod while the fisherman is seated, and (4) making sure that the overall rod length is sufficient to allow the line to clear the rail or transom of most fishing boats even while the fisherman is seated.

SUMMARY OF THE INVENTION

In accordance with the present invention, a deep-sea fishing rod of the short-butt type is telescopically combined with an elongate extension socket that fits snugly around the butt in nonrotatable relationship relative thereto. The telescopic relationship is only partial, so that a substantial lower region of the socket extends downwardly below the butt. At the lower end of such socket, there is a gimbal knock that extends nonrotatably into the gimbal of a bucket harness associated with a fishing chair. Thus, the bucket harness and gimbal support the socket which in turn supports the rod, the socket operating to prevent downward movement of the rod despite large downward axial forces which are often present when the fish is fought. The length of the socket extension, and the degree of telescoping of the butt into the socket, are such that the reel is maintained at an elevation substantially higher than that of a reel mounted on a conventional-length butt associated with the same gimbal. Thus, the effective length of the socket-rod combination elevates the reel and extends the rod. The reel is caused to be at a more convenient elevation for the fisherman, and the rod extension is such as to increase leverage while causing the overall rod length is sufficient to allow the line to clear the rail or transom.

In accordance with the method, the fisherman uses the short-butt fishing rod at any desired part of the boat, while in standing position. When the fisherman becomes tired, for example during fighting of a relatively large fish so that continued fighting while in seated position becomes desirable, the fisherman sits down in the fishing chair and introduces the lower end of the butt into the extension socket, the latter then being inserted into the gimbal of the chair. Thereafter, the fisherman grasps the rod at a location between the reel and the tip so that there is much leverage in combination with the extended rod. At any time, the fisherman may resume a standing position by merely lifting the short butt out of the socket extension.

BRIEF DESCRIPTION OF THE DRAWINGS

FIG. 2 is an isometric view, partially broken away and sectioned, showing the extension socket;

FIG. 3 is a side elevational view, partially exploded, showing the extension socket as related to the short butt; and FIG. 4 is a longitudinal sectional view showing the extension socket and short butt in fully telescoped relationship showing the lower end of the extension socket as mounted in a gimbal.

DETAILED DESCRIPTION OF THE PREFERRED EMBODIMENT

Figure 1:
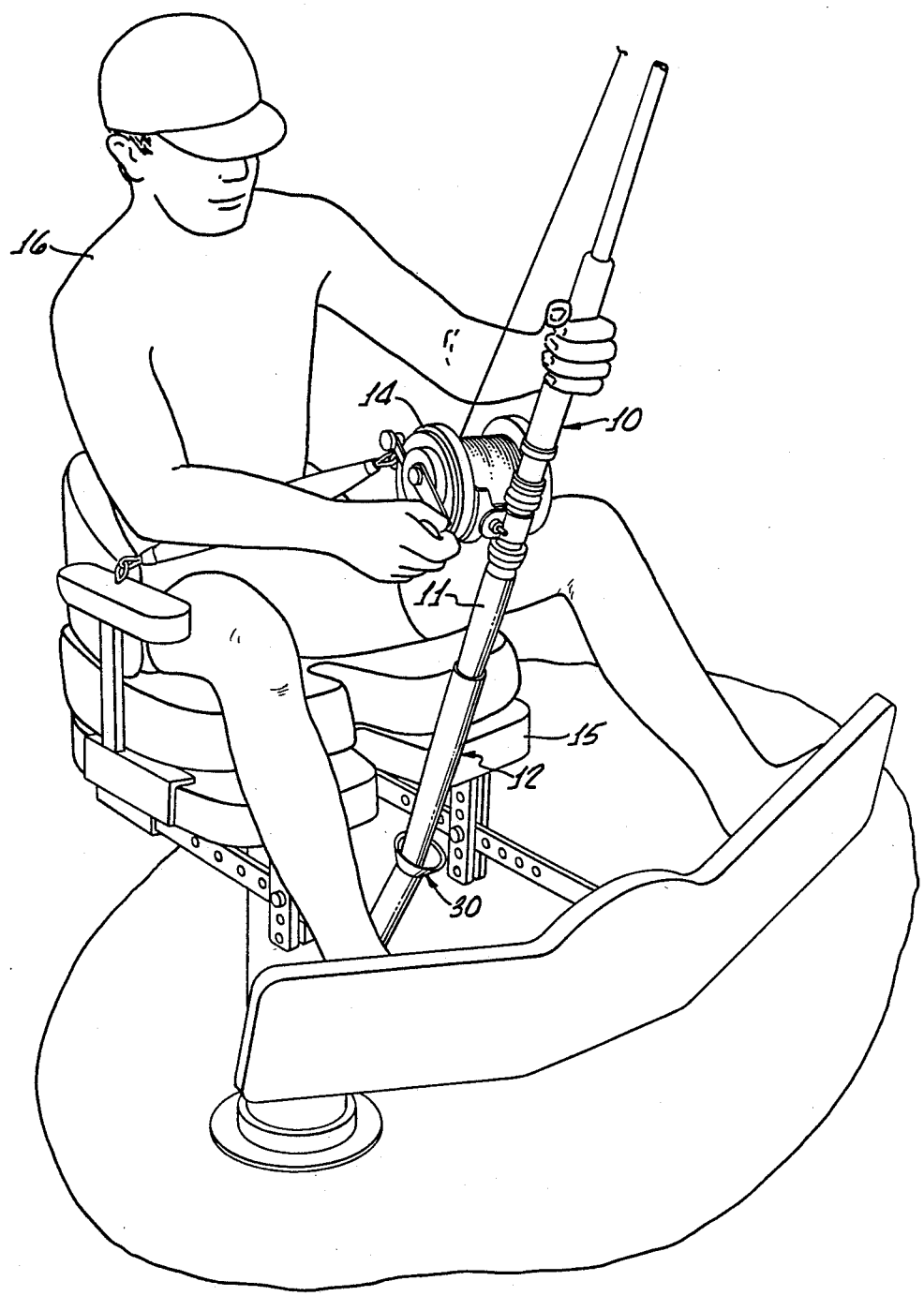
FIG. 1 is an isometric view showing the combination fishing rod, extension socket and harness in use while the fisherman is seated in a chair.

Referring first to FIG. 1, a deep-sea fishing rod 10 having a short butt 11 is supported by an extension socket 12 and a chair gimbal. There is a predetermined degree of partial telescoping of the butt 11 into extension socket 12, the relationship being such that the reel 14 mounted on butt 11 is disposed at a relatively high elevation.

Stated otherwise, the elevation of reel 14 in the illustrated combination is substantially higher than would be the case if the reel were mounted on a fishing rod having a (conventional) long butt and no extension socket, the conventional butt being supported in the same chair gimbal. Thus, the fisherman 16 has the benefit of substantial leverage when fighting a fish and, furthermore, it is assured that the overall rod length is sufficient to allow the line to clear the rail or transom of a typical fishing boat when the rod 10 is in a position much closer to be horizontal than is the illustrated position, when the fisherman is sitting in chair 15.

Referring to FIG. 2, the extension socket 12 is illustrated as being an elongate hollow aluminum tube 17 that has a circular opening 18 at its upper end. The upper portion of tube 17 is generally cylindrical, while the lower portion is gradually downwardly convergent. The bottom of tube 17 is sealed by a gimbal knock 19 the tennon 20 (FIG. 4) of which is press-fit into a reduced-diameter lower end portion of tube 17. Gimbal knock 19 has two sets of orthogonally-related notches or recesses 21 adapted to be nonrotatably associated (as stated below) with a transverse pin in the bucket harness.

Formed integrally in tube 17 is a circular shoulder 22, FIG. 2, which lies in a plane perpendicular to the tube axis. The shoulder is spaced a substantial distance, preferably about six inches, from the open upper end of the tube. A hollow cylindrical bushing 23, also formed of aluminum, is mounted in tube 17 and seated on shoulder 22. Preferably, bushing 23 is both press-fit into, and secured by epoxy to, the interior cylindrical surface of tube 17 adjacent shoulder 22, being thus fixed against rotational and axial movement. A pin 24 is extended through holes in diametrically-opposite portions of bushing 23, so that rotation of the pin about an axis longitudinal to tube 17 is prevented by the bushing. The upper edge 26 of bushing 23 is frustoconical and downwardly convergent.

As shown in FIG. 4, the lower portion of butt 11 is gradually tapered or downwardly convergent and is telescoped into the tube portion 17 of extension socket 12. The relationship is such that the gimbal knock 27 of short butt 11 is seated relatively snugly within the interior cylindrical surface of bushing 23, as shown in FIG. 4. The notches or recesses 28 of gimbal knock 27 receive the pin 24 to thus prevent rotation of the fishing rod.

At the same time that the gimbal knock 27 is seated nonrotatably and relatively snugly within bushing 23, an intermediate region of the lower tapered portion of the tubular body of butt 11 is seated relatively snugly in the opening 18 at the upper end of socket tube 17. Thus, the extension socket 12 forms a relatively long extension of butt 11, and is so associated with the butt that the latter does not tilt or rattle to any substantial extent relative to the extension socket. It is emphasized that no amount of downward axial force on the butt 11, that would be present during any fishing operation, will increase the degree of telescoping of butt 11 into tube 17 because the gimbal knock 22 is seated on pin 24, and the bushing 23 is seated on shoulder 22 and thus (and because of the epoxy) cannot be forced downwardly below the position shown in FIGS. 2 and 4.

As a preferred example, the extension socket 12 is about eighteen inches long, and the butt 11 telescopes about six inches into the extension socket when in fully-seated condition therein. Thus, the effective length of butt 12 is increased by about one foot when the butt is in its telescoped relationship in the extension socket.

Except for dimensions, the butt 11 and the associated reel seat, and the connection to the butt of the end of the shaft of the fishing rod, are constructed substantially the same as described in detail in U.S. Pat. No. 4,083,141, for Swaged Integral Butt and Reel Seat for Fishing Rod. Such patent is hereby incorporated by reference herein.

DESCRIPTION OF THE METHOD

The fisherman uses the fishing rod 10, including its butt 11 and the associated reel 14 and tackle, to deep-sea fish while in standing condition at any part of the boat near the rail, transom or bow thereof. Then, when he becomes tired during a fight with a fish, the fisherman sits down in chair 15 and telescopes the lower end of butt 11 into extension socket 12. When the gimbal knock 27 at the bottom of butt 11 engages bushing 23, the tapered edge 26 of the bushing guides the gimbal knock into a central position such that it may penetrate the bushing and seat on pin 24 in nonrotatable relationship.

The bottom end of the extension socket 12 is inserted into the gimbal 30 of chair 15 (FIGS. 1 and 4), being nonrotatably mounted therein because of the presence of the pin 31 in such gimbal 30 and which is associated with the notches 21 of gimbal knock 19. Pins 24 and 31 are parallel to each other, because bushing 23 is so rotated as to be parallel to one set of notches 21.

The combination extension socket 12 and butt 11 elevates the reel 14 to the position illustrated in FIG. 1, which creates much leverage for fighting the fish while, at the same time, assuring that the combination fishing rod and extension socket 12 are sufficiently long that the overall rod length is sufficient to allow the line to clear the rail or transom of conventional fishing boats.

While fishing, the fisherman grasps the handle portion at the lower end of the shaft or rod 10 with one hand while operating the reel 14 with the other hand, or holds the rod at the reel, using the straps connected to the harness. When the combination rod 10 and extension socket 12 are pumped, there is a substantial downward axial thrust toward gimbal 30 but this is fully absorbed by the extension socket 12 as described above. The pins 24,31 and associated notches prevent the rod from turning about its longitudinal axis.

The butt extending apparatus of the present invention can be used also with a short curved butt.

The foregoing detailed description is to be clearly understood as given by way of illustration and example only, the spirit and scope of this invention being limited solely by the appended claims.

What is claimed is:

1. A deep-sea fishing rod combination, which comprises:
    (a) a deep-sea fishing rod having an elongate butt,
    (b) an elongate extension socket for said butt,
        said extension socket being a hollow tube one end of which is open and the other end of which is not connected to any support,
        said tube having the bottom end portion of said butt removably telescoped into it a substantial predetermined distance through said one end,
        said extension socket being so related to said butt that said butt is a relatively snug fit in said extension socket when telescoped said predetermined distance therein,
    (c) seat means provided in said hollow tube and seating said bottom end portion of said butt,
        thereby limiting the amount of telescoping of said butt into said one end of said tube, despite axial thrust forces tending to increase said amount of telescoping, said seat means being such as to determine said predetermined telescoped distance and to limit said predetermined telescoped distance to an amount greatly less than the full length of said hollow tube,
        whereby the combination butt and extension socket has a length greatly longer than the length of said butt, when said butt is telescoped said predetermined distance into said extension socket, and
    (d) means at the bottom end of said extension socket to removably mount said extension socket on a rod support.

2. The invention as claimed in claim 1, in which said seat means (c) includes a cross pin, and in which the bottom end of said butt is a gimbal knock nonrotatably associated with said cross pin.

3. The invention as claimed in claim 1, in which a gimbal is provided to support said combination of said fishing rod and extension socket, the bottom end of said extension socket being inserted into said gimbal.

4. The invention as claimed in claim 1, in which said seat means is such that said predetermined telescoped distance is about ⅓ the length of said extension socket.

5. The invention as claimed in claim 1, in which said butt is a short butt.

6. A deep-sea fishing rod combination, which comprises:
    (a) a deep-sea fishing rod having an elongate butt,
    (b) an elongate extension socket,
        said extension socket being a hollow tube open at one end,
        said tube having the bottom end portion of said butt telescoped into it a substantial distance through said one end,
    (c) seat means provided in said hollow tube and seating said bottom end portion of said butt,
        thereby limiting the degree of telescoping of said butt into said one end of said tube despite axial thrust forces tending to increase said degree of telescoping, and (d) a gimbal provided to support said combination of said fishing rod and extension socket,
the bottom end of said extension socket being inserted into said gimbal,
said bottom end of said extension socket being a gimbal knock nonrotatably associated with said gimbal.

7. A deep-sea fishing rod combination, which comprises:
(a) a deep-sea fishing rod having a butt the length of which is many times longer than the diameter thereof,
said butt having a lower portion that progressively decreases in diameter in a direction away from the shaft of said fishing rod,
said butt having a gimbal knock at the extreme lower end thereof,
(b) an elongate extension socket,
said extension socket being a hollow tube open at one end,
said tube having the bottom end portion of said butt telescoped into it a predetermined substantial distance through said one end to achieve a predetermined telescoped relationship,
said predetermined substantial distance being greatly less than the length of said tube,
the inner distance of said tube at said one end substantially corresponding to the exterior diameter of said butt at the portion of said butt which is adjacent said one end when said butt and tube are in said predetermined telescoped relationship, and
(c) a bushing mounted in said hollow tube in spaced relationship from said one end thereof,
said bushing being a hollow cylinder mounted snugly in said tube,
the interior diameter of said cylinder substantially corresponding to the exterior diameter of said bottom end portion of said butt,
whereby said bushing centers said bottom end portion of said butt and cooperates with said one end of said extension socket in preventing substantial tilting of said butt relative to said extension socket.

8. The invention as claimed in claim 7, in which said bushing is fixedly mounted in said hollow tube.

9. The invention as claimed in claim 7, in which the upper edge of said bushing is downwardly convergent whereby said bushing guides said bottom end portion of said butt into said bushing during telescoping of said butt into said extension socket.

10. The invention as claimed in claim 8, in which a cross member is mounted in said bushing, in which said bottom end portion of said butt is a gimbal knock, and in which said gimbal knock is nonrotatably associated with said cross member when said bottom end portion of said butt is in fully-inserted relationship in said bushing.

11. The invention as claimed in claim 7, in which an interior shoulder is provided in said tube to seat said bushing and prevent said bushing from being forced an undesirable distance away from said one end of said extension socket, and in which said bushing is fixedly secured in said tube adjacent said shoulder.

12. The invention as claimed in claim 7, in which said butt is nonrotatably associated with said extension socket, in which a chair is provided having a gimbal, and in which the bottom portion of said extension socket is a gimbal knock nonrotatably associated with said gimbal.

13. The invention as claimed in claim 7, in which said butt is a short butt formed or swaged aluminum, and in which said extension socket is also formed of aluminum.

14. A method of deep-sea fishing, which comprises:
(a) providing a deep-sea fishing rod having a short butt,
(b) employing said rod while in standing condition and at any desired part of a fishing boat near a rail, transom or bow thereof,
(c) providing an extension socket adapted to telescopically receive said short butt in only partially-telescoped relationship whereby the combination of said short butt and extension socket forms a relatively long fishing rod, said extension socket incorporating means to prevent undesired telescoping of said short butt into said extension socket despite axial forces tending to force said short butt into said extension socket,
(d) sitting in a fishing chair and telescoping said short butt into said extension socket,
(e) seating the bottom of said extension socket in a gimbal, and
(f) fishing while said short butt is telescoped into said extension socket, and said extension socket is seated in said gimbal.

15. The invention as claimed in claim 14, in which said method further comprises the steps of preventing substantial rotation of said short butt relative to said extension socket while said short butt is telescoped into said extension socket, and preventing substantial rotation of said extension socket in said gimbal while said extension socket is seated in said gimbal.

* * * * *